(12) United States Patent
Chen

(10) Patent No.: US 6,783,350 B2
(45) Date of Patent: Aug. 31, 2004

(54) APPARATUS FOR MANUFACTURING SLIDE FASTENER COIL-SHAPED CONTINUOUS ELEMENT ROW

(76) Inventor: Hung An Chen, 4 Fl. No. 27, Lane 160, Hsin-Sheng S. Road, Sec. 1, Taipei 100 (TW)

( * ) Notice: Subject to any disclaimer, the term of this patent is extended or adjusted under 35 U.S.C. 154(b) by 232 days.

(21) Appl. No.: 10/187,612

(22) Filed: Jul. 3, 2002

(65) Prior Publication Data

US 2004/0005375 A1 Jan. 8, 2004

(51) Int. Cl.$^7$ ............................................. B29C 53/32
(52) U.S. Cl. ..................... 425/193; 425/321; 425/814; 425/DIG. 7; 425/391; 29/410
(58) Field of Search .......................... 425/319, 321, 425/DIG. 7, 126.1, 127, 193, 129.1, 545, 294, 814, 391, 393; 29/408–410

(56) References Cited

U.S. PATENT DOCUMENTS

| | | | | |
|---|---|---|---|---|
| 3,688,805 A | * | 9/1972 | Moertel | 425/814 |
| 3,729,800 A | * | 5/1973 | Popovitsch | 425/814 |
| 4,325,184 A | * | 4/1982 | Omori | 425/391 |
| 4,501,547 A | * | 2/1985 | Mizuhara et al. | 425/391 |
| 4,599,065 A | * | 7/1986 | Takahashi | 425/394 |
| 4,743,412 A | * | 5/1988 | Kuse | 425/814 |
| 5,698,239 A | * | 12/1997 | Tsai et al. | 425/384 |
| 6,302,676 B1 | | 10/2001 | Kato et al. | 425/335 |

* cited by examiner

*Primary Examiner*—Robert Davis
*Assistant Examiner*—Thu Khanh T. Nguyen
(74) *Attorney, Agent, or Firm*—Troxell Law Office PLLC

(57) ABSTRACT

An apparatus for manufacturing slide fastener coil-shaped continuous element row comprises a forming screw assembly, a die assembly, an abutment assembly, and a rear forming assembly having one or two shuttle assemblies or a shaft mechanism. An arcuate recessed portion is formed on a top side of either element or a flat area formed on a bottom side of either element when the arcuate piece of the top shuttle assembly or the flat piece of the bottom shuttle assembly is abutted on the element so that the invention can effect a stable operation and a precise positioning of zipper forming space by manipulating the rear forming assembly in an adjustment operation.

18 Claims, 13 Drawing Sheets

APPARATUS FOR MANUFACTURING SLIDE FASTENER COIL-SHAPED CONTINUOUS ELEMENT ROW

BACKGROUND OF THE INVENTION

1. Field of the Invention

The present invention relates to slide fastener (e.g., zipper) continuous element row manufacturing and more particularly to an improved apparatus for manufacturing slide fastener coil-shaped continuous element row.

2. Description of Related Art

A coupling head forming portion of a conventional apparatus for manufacturing slide fastener continuous element row is disclosed in U.S. Pat. No. 6,302,676, as shown in FIGS. 17–20. The apparatus comprises a pair of screws 1, a die 2, a coupling head forming disc 3, a mandrel 4 between the die 2 and the forming disc 3, a core thread 5 received in a longitudinal recess of the mandrel 4, and an element 6 received in a space defined by the die 2 and the coupling head forming disc 3, the element 6 having a joint portion 6a and an coupling head 6b formed by the coupling head forming disc 3.

An upper leg portion forming portion of the apparatus is shown in FIG. 19. It further comprises a rotary hammer 7 having an inclined peripheral surface 7a proximate a core thread guide groove 6c while operating. The element 6 is stitched to a fabric. However, the seam may be disengaged from the core thread guide groove 6c because the core thread guide groove 6c is open.

However, the prior art suffered from several disadvantages due to undesirable constructions of the screw 1 and the die 2. For example, the diameter of the screw 1 is limited such as between 6.5 mm and 8 mm. As such, a diameter of a shaft 3a of the coupling head forming disc 3 is also limited. Otherwise, there is a possibility of interference between the shaft 3a and the screw 1 at either side of the coupling head forming disc 3. Hence, the coupling head forming disc 3 may vibrate strongly due to a high forming pressure and rotation of the coupling head forming disc 3 in the manufacturing process of the element 6. In brief, a strength of the shaft 3a is not sufficient. Further, if sizes of all of the screw 1, the die 2, and the coupling head forming disc 3 are increased, the necks 2a may become sharp (i.e., smaller cross-sections) for conforming with the diameters of the screws 1. This can reduce a contact area in the manufacturing process of the element 6. In response, the joint portion 6a of the element 6 may recess (i.e., deformed). Furthermore, a precision of the element 6 may be adversely affected because a size of the mandrel 4 is small and the mandrel 4 tends to wear (i.e., size changed) or the size of the mandrel 4 exceeds an allowance due to machining error. At this time, an appropriate adjustment of locations of the necks 2a, the mandrel 4, and the coupling head forming disc 3 is required. However, such adjustment is very difficult because the necks 22 are integral part of the die 2 and the coupling head forming disc 3 rotates about the shaft 3a. Moreover, as shown in FIGS. 18 and 20, the element 6 thus produced by the prior art has a slightly arcuate bottom side 6d. Hence, a point contact is formed as the element 6 is stitched to the fabric 8. In other words, both contact area and friction are small. As such, the element 6 tend to slip (i.e., displace) in use. In response, the seam may be displaced. Thus, it is desirable to provide an improved apparatus for manufacturing slide fastener coil-shaped continuous element row in order to overcome the above drawbacks of the prior art.

SUMMARY OF THE INVENTION

It is an object of the present invention to provide an apparatus for manufacturing slide fastener coil-shaped continuous element row wherein a rear forming assembly is secured to a rear abutment plate, the rear forming assembly being operable to stably perform a lateral or axial adjustment of the apparatus so as to provide an optimal zipper forming space defined by front and rear abutment plates, screws, and a mandrel. Thus, high quality products are manufactured.

In one aspect of the present invention, a fine adjustment is made in rear of an abutment assembly so that the adjustment is made easy and simple.

In another aspect of the present invention, once the element has been stitched to a fabric, a seam will be prevented from disengaging because it is protected by an arcuate recessed portion formed on a top side of the element.

In still another object of the present invention, both contact area and friction between the element and the fabric can be increased significantly by the provision of flat area formed on a bottom side of the element when a flat piece of the bottom shuttle assembly is abutted on the element.

The above and other objects, features and advantages of the present invention will become apparent from the following detailed description taken with the accompanying drawings.

DETAILED DESCRIPTION OF THE PREFERRED EMBODIMENTS

Figure 1:
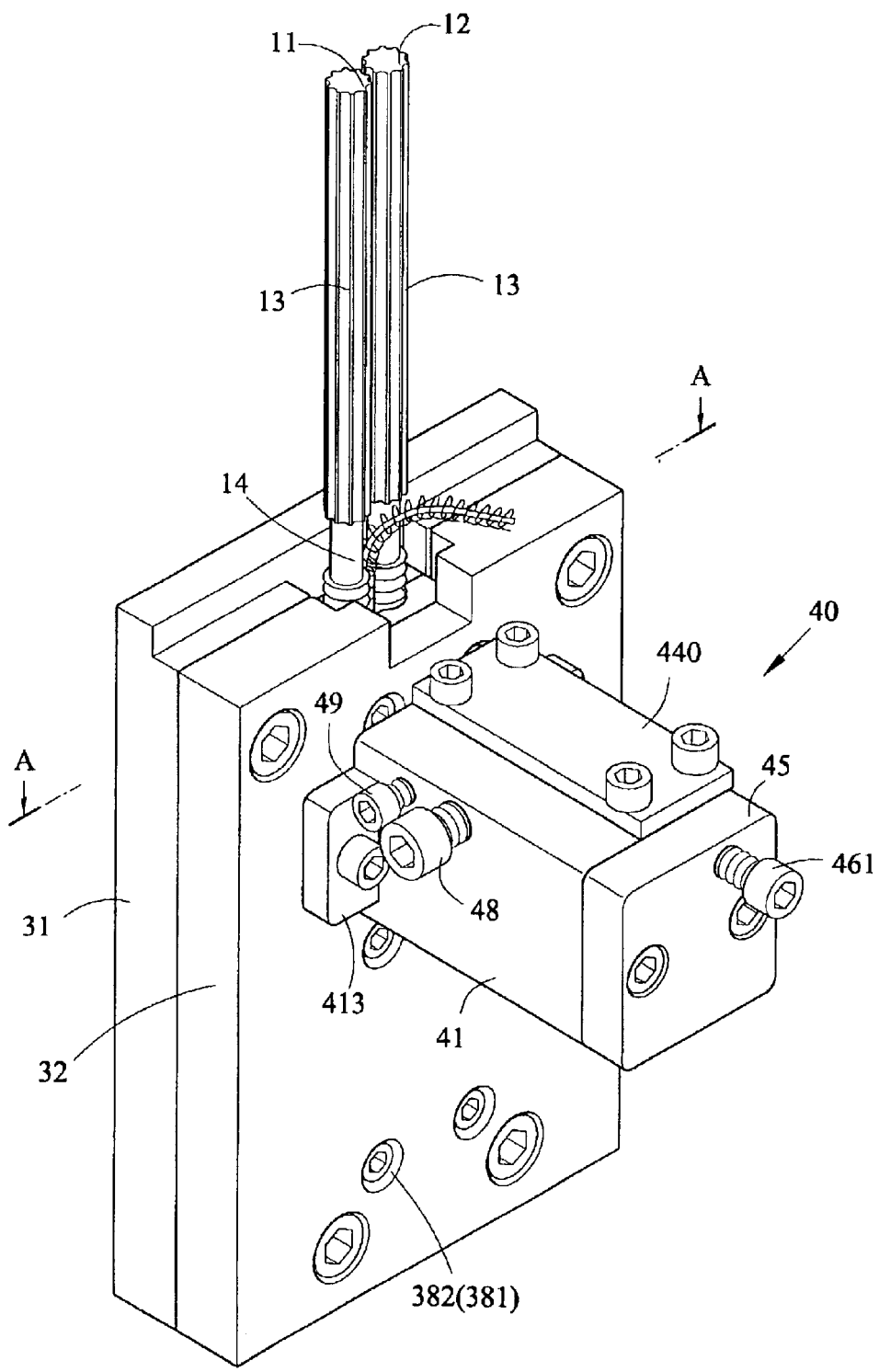
FIG. 1 is a perspective view of a first preferred embodiment of an apparatus for manufacturing slide fastener coil-shaped continuous element row according to the invention.
Figure 2:
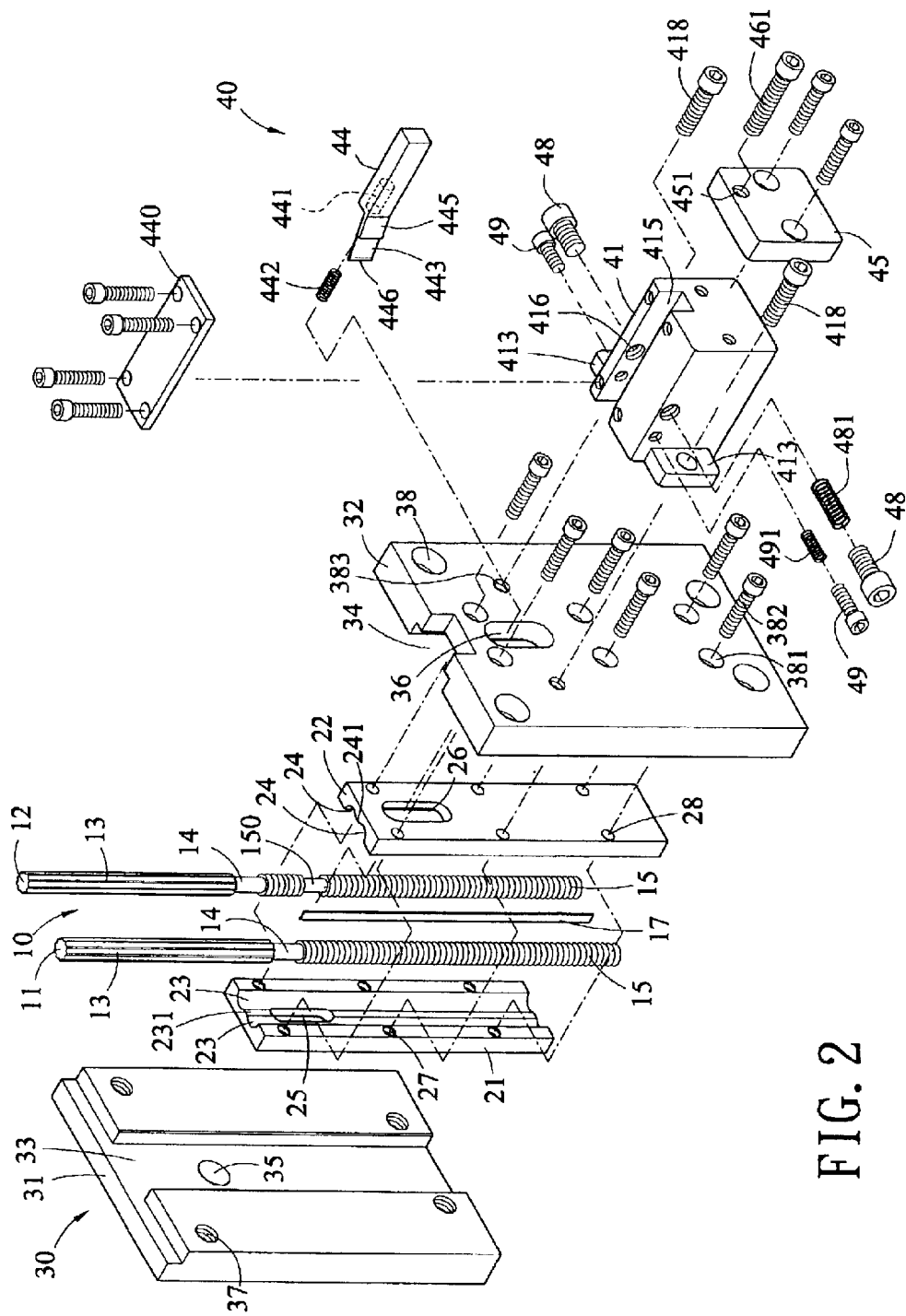
FIG. 2 is an exploded view of FIG. 1.

Referring to FIGS. 1 to 5, there is shown an apparatus for manufacturing slide fastener coil-shaped continuous element row constructed in accordance with the invention. The apparatus comprises a forming screw assembly 10 consisting of first and second screws 11 and 12, a die assembly 20 consisting of front and rear dies 21 and 22, an abutment assembly 30 consisting of front and rear abutment plates 31 and 32, and a rear forming assembly 40 including a block member 41, a shuttle assembly 44, and a rear cap 45. Each of above components will now be described in detail below.

The block member 41 is threadedly secured to the rear abutment plate 32 and comprises a top channel 415 for receiving the shuttle assembly 44 and a side hole 416 at either side for receiving shanks of the side adjustment screw 48. The shuttle assembly 44 comprises a front cylindrical recess 441, a coil spring 442 anchored in the cylindrical recess 441, a slanted piece 443 extended from an opening of the cylindrical recess 441, and an arcuate piece 446 formed on an open end of the slanted piece 443, the shuttle assembly 44 being defined in the top channel 415 by a top cap 440 which is threadedly secured to a top of the block member 41. The rear cap 45 is threadedly secured to a rear side of the block member 41 and comprises an aperture 451 for permitting a rear adjustment screw 461 to drive through the aperture 451 to engage with the rear side of the shuttle assembly 44.

Each of the first and second screws 11 and 12 comprises an upper ridged post 13, an intermediate neck 14, and a lower thread section 15. Further, the second screw 12 comprises a second neck 150 below the neck 14 by a predetermined distance. The second neck 150 is served to provide a space for preventing the second screw 12 from interfering with an operation of the slanted piece 443 and the arcuate piece 446.

The front die 21 is a rectangular plate and comprises two parallel half circular longitudinal grooves 23, a half-neck 231 sandwiched between the grooves 23, an elongate slot 25 in the half-neck 231, and a plurality of equally spaced apertures 27 at either longitudinal side (six are shown). The rear die 22 is identical to the front die 21 and comprises two parallel half circular longitudinal grooves 24, a half-neck 241 sandwiched between the grooves 24, an elongate slot 26 in the half-neck 241, and a plurality of equally spaced apertures (six are shown) 28 at either longitudinal side. Hence, a combination of the grooves 23 and 24 can receive the first and the second screws 11 and 12. Also, a combination of the half-necks 231 and 241 can receive a mandrel 17.

The front abutment plate 31 is a rectangular member and comprises an inner longitudinal trough 33 sized to receive the front die 21, a hole 35 through the trough 33, and a plurality of apertures (four are shown) 37 at either longitudinal side. The rear abutment plate 32 is also shaped as a rectangular member and comprises an inner longitudinal trough 34 sized to receive the rear die 22, an elongate slot 36 through the trough 34, a plurality of apertures 38, 381, and 383, and a plurality of screws 382. A plurality of screws are driven through the apertures 38 and 37 to fasten the front and the rear abutment plates 31 and 32 together. Likewise, the plurality of screws 382 are driven through the apertures 381, 28, and 27 to fasten the rear abutment plate 32 and the front and the rear dies 21 and 22 together.

With this construction, an arcuate recessed portion 65 is formed on a side of the element 62 as the arcuate piece 446 of the shuttle assembly 44 is abutted on the element 62. As such, a stable apparatus for manufacturing slide fastener coil-shaped continuous element row having a feature of very little vibration can be obtained. In addition, an accurate position of the arcuate recessed portion 65 can be obtained by adjusting the rear adjustment screw 461 and the side adjustment screw 48. Note that the block member 41 may further comprises a lug 413 having a hole at either side so that the block member 41 is capable of threadedly securing to the rear abutment plate 32 by driving screws 418—418 through the holes of the lugs 413 and the apertures 383. Further note that there are further provided an elastic member (e.g., coil spring) 481 in one hole 416 biased between the side adjustment screw 48 and the shuttle assembly 44. This can facilitate a lateral adjustment of the apparatus as detailed later.

Figure 3:
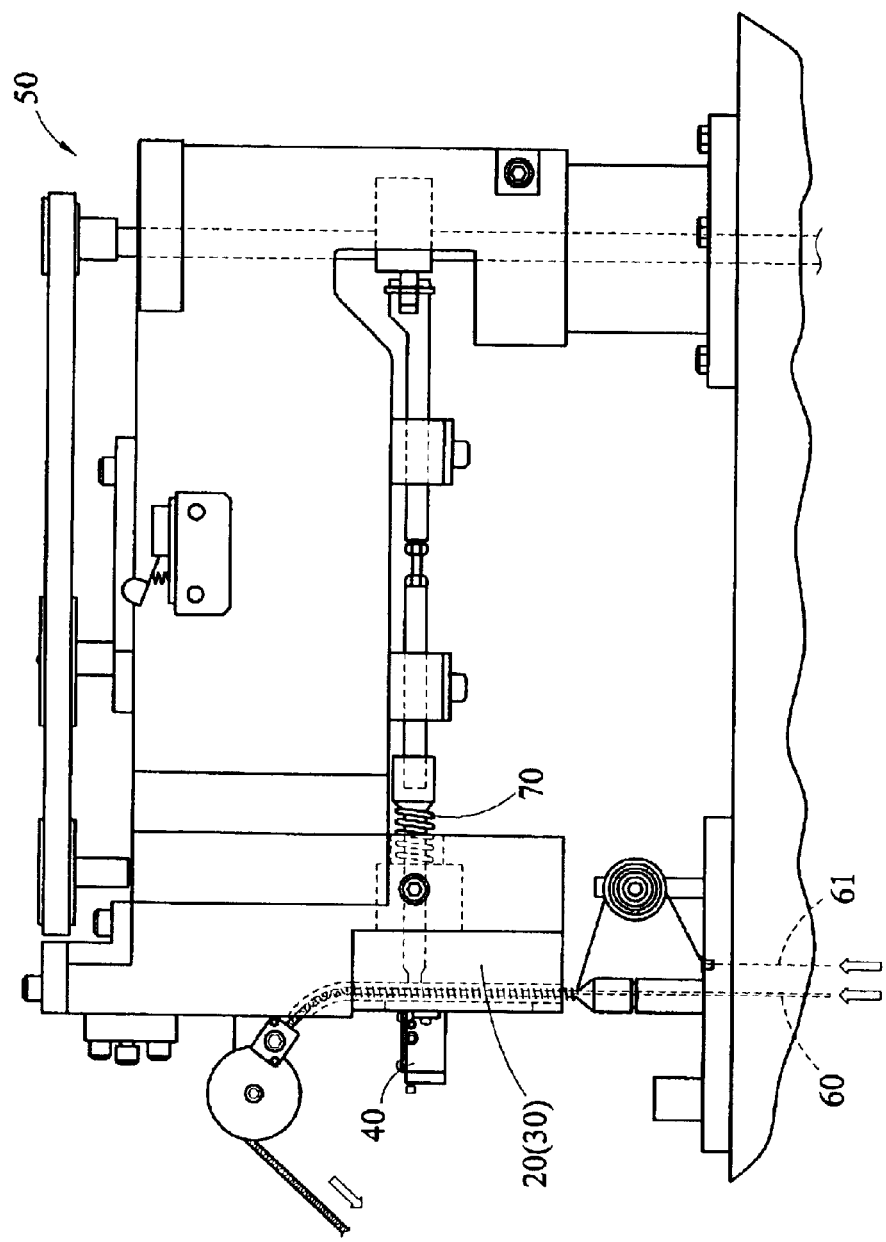
FIG. 3 is a side view showing the apparatus mounted on a zipper machine.
Figure 4:
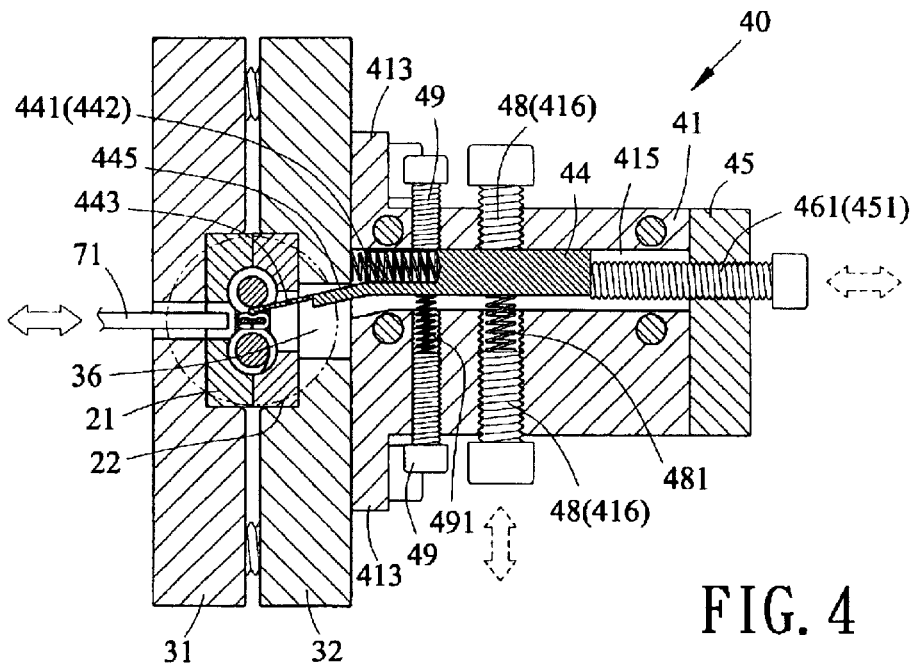
FIG. 4 is a cross-sectional view taken along line A—A of FIG. 1.
Figure 5:
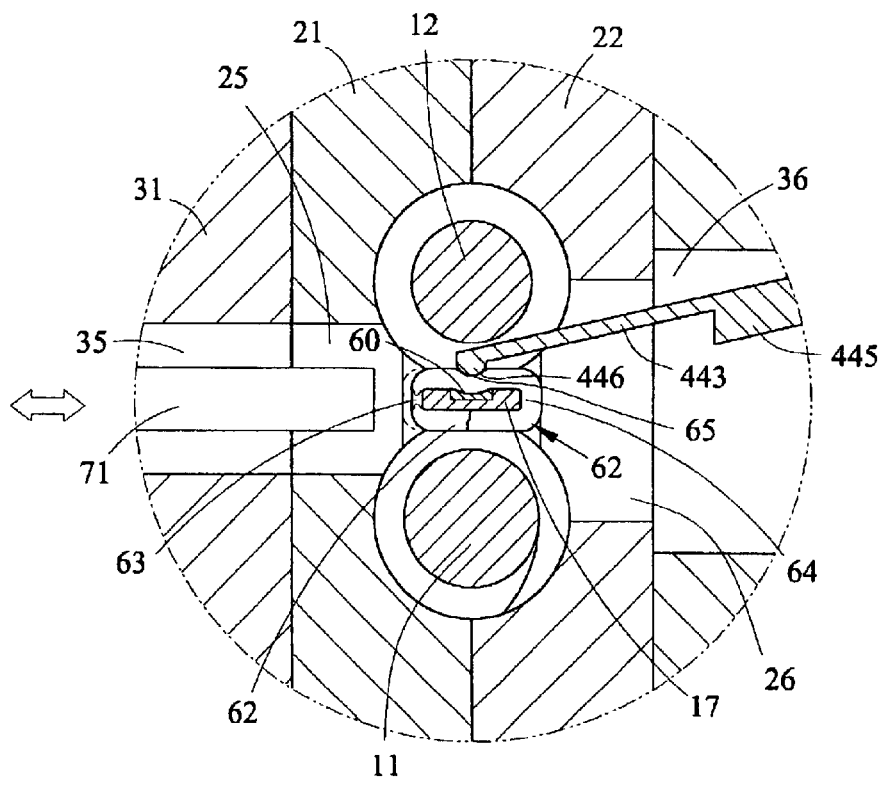
FIG. 5 is a greatly enlarged fragmentary view of the circle shown in FIG. 4.
Figure 6:
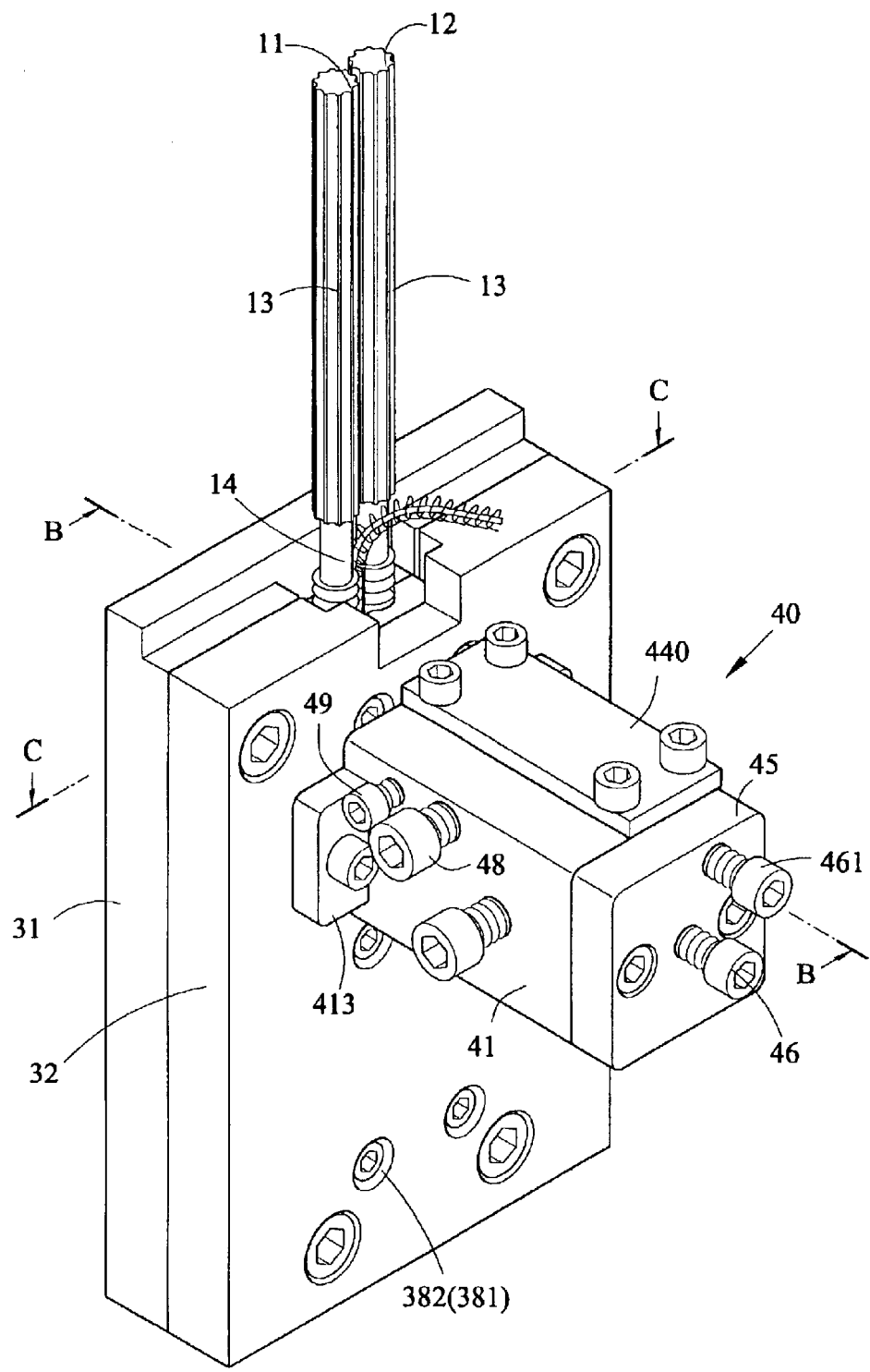
FIG. 6 is a perspective view of a second preferred embodiment of an apparatus for manufacturing slide fastener coil-shaped continuous element row according to the invention.
Figure 7:
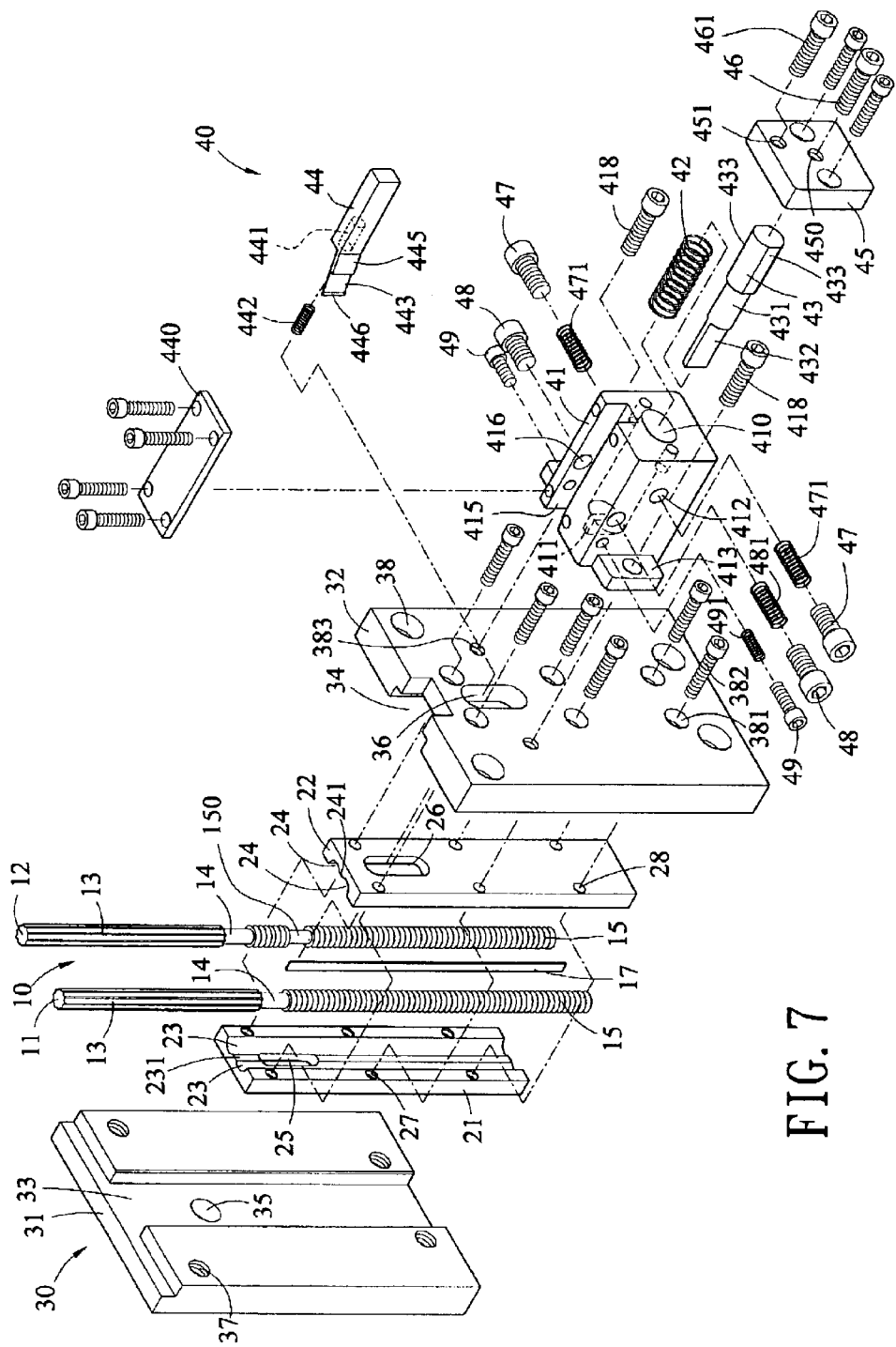
FIG. 7 is an exploded view of FIG. 6.
Figure 8:
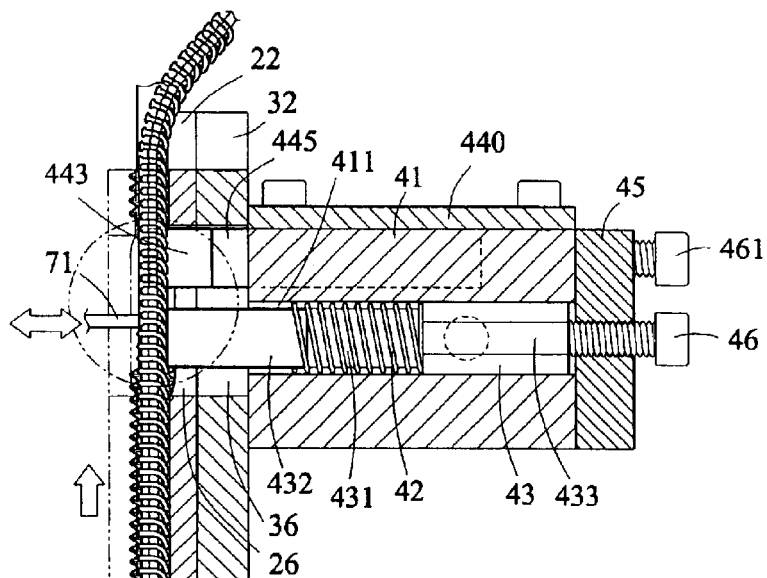
FIG. 8 is a cross-sectional view taken along line B—B of FIG. 6.
Figure 9:
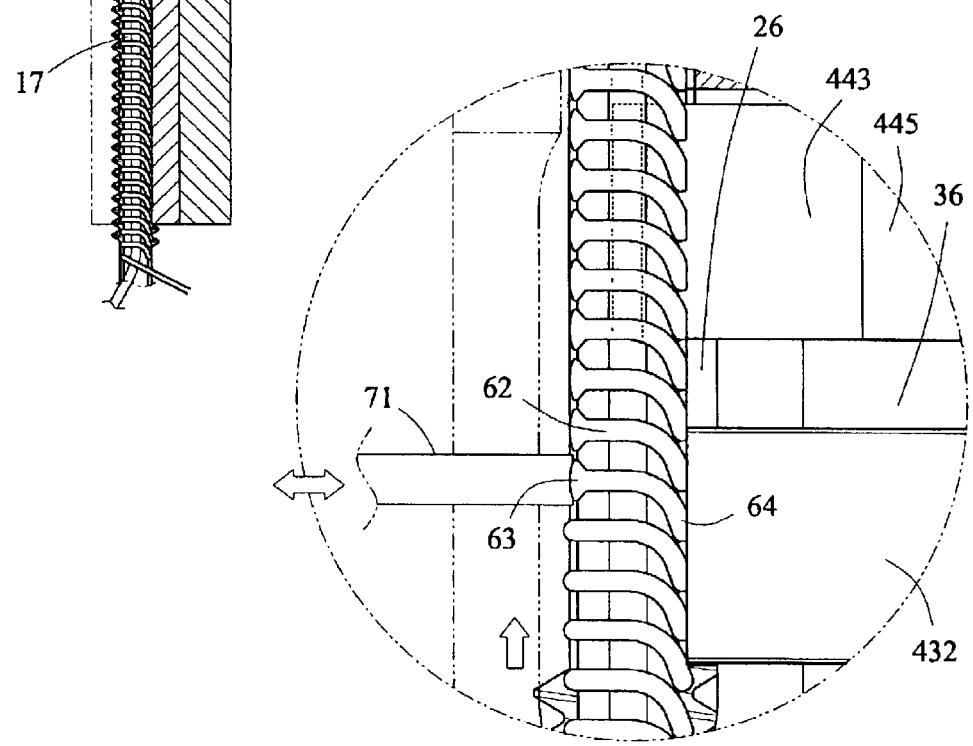
FIG. 9 is a greatly enlarged fragmentary view of the circle shown in FIG. 8.
Figure 10:
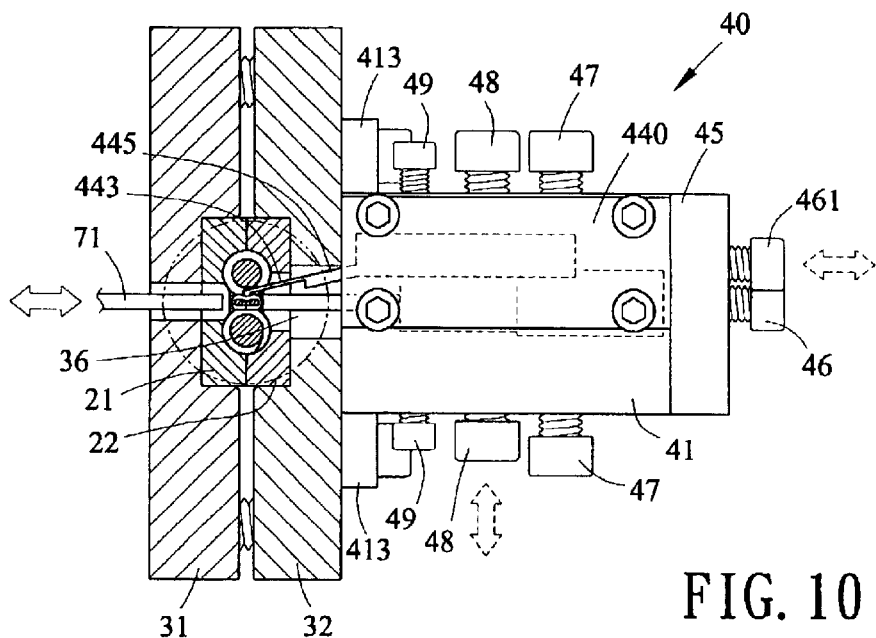
FIG. 10 is a cross-sectional view taken along line C—C of FIG. 6.
Figure 11:
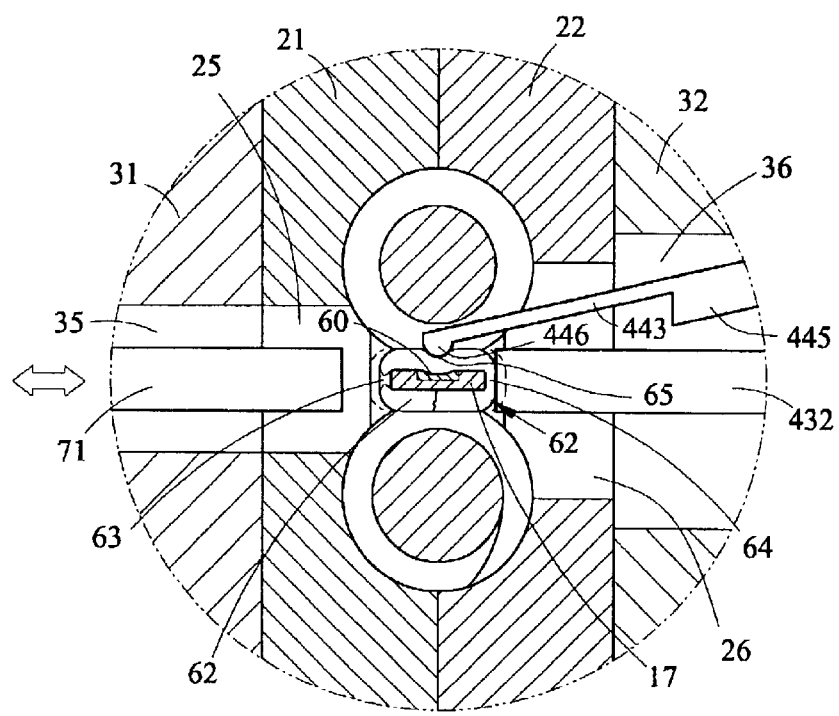
FIG. 11 is a greatly enlarged fragmentary view of the circle shown in FIG. 10.
Figure 12:
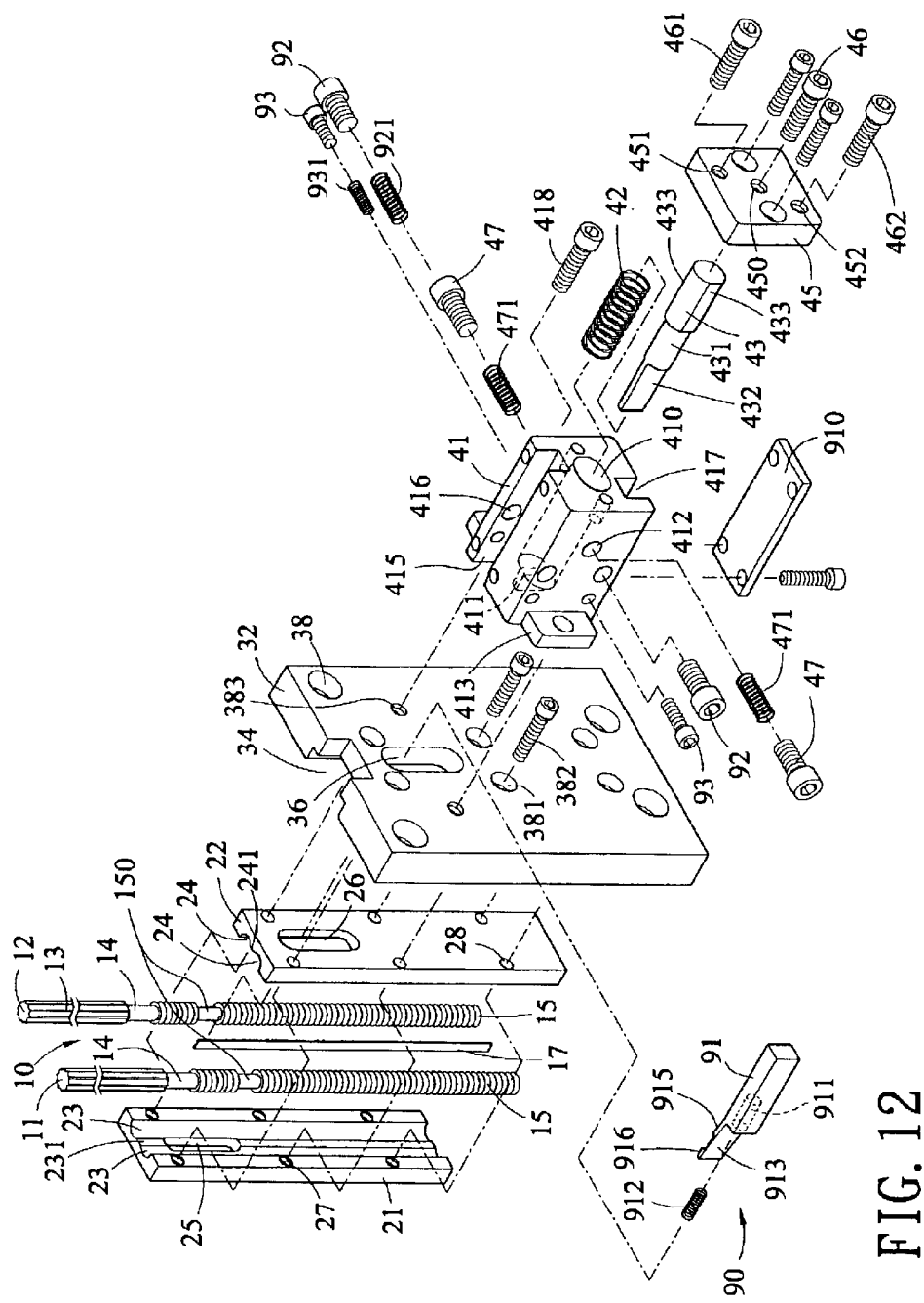
FIG. 12 is an exploded view of a third preferred embodiment of an apparatus for manufacturing slide fastener coil-shaped continuous element row according to the invention.
Figure 13:
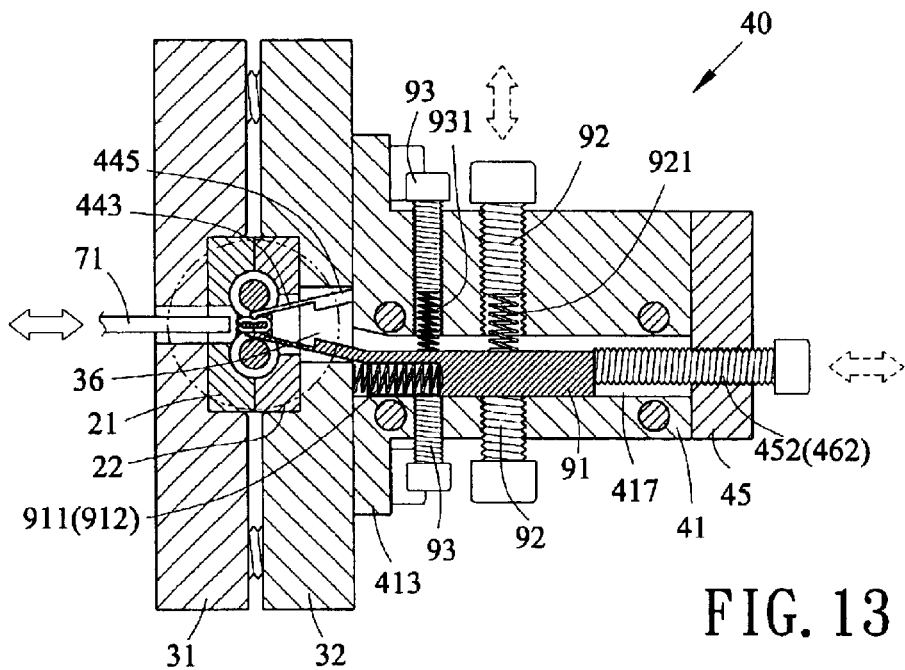
FIG. 13 is a cross-sectional view of the assembled die assembly, abutment assembly, and rear forming assembly of FIG. 12 showing adjustments of the apparatus.
Figure 14:
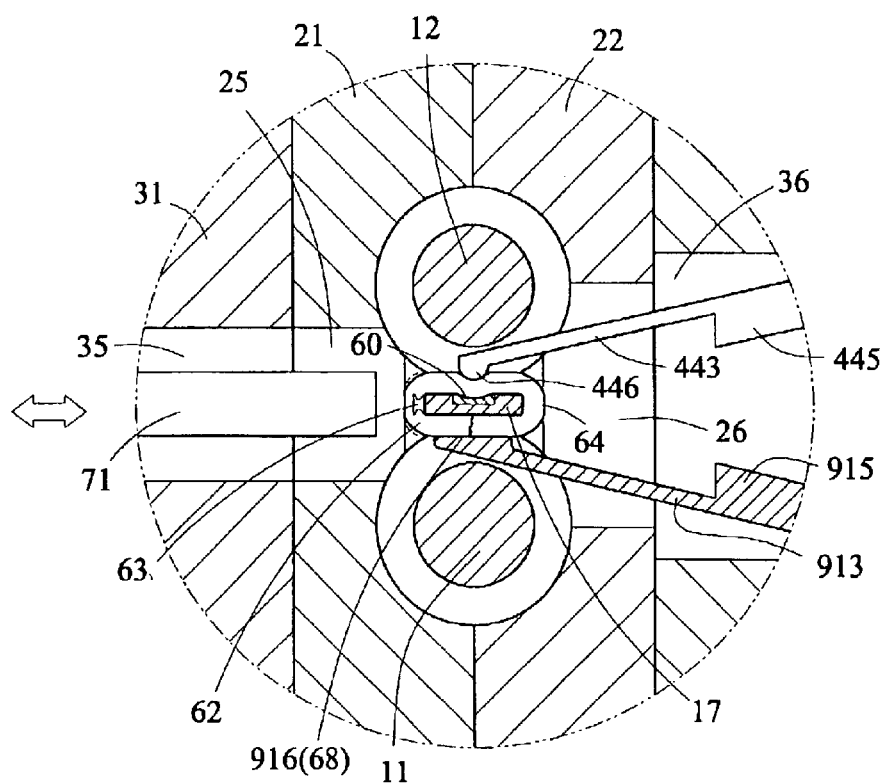
FIG. 14 is a greatly enlarged fragmentary view of the circle shown in FIG. 13.

Referring further to FIGS. 3, 4 and 5 specifically, an operation and characteristics of the invention will now be described in detail below. The apparatus for manufacturing slide fastener coil-shaped continuous element row is mounted on a stand 50 of a zipper machine. A zipper forming space is defined by the front and the rear abutment plates 31 and 32, the screws 11 and 12, and the mandrel 17. A monofilament 61 is guided from a source (not shown) into the zipper forming space. The mandrel 17 has a longitudinal recess for permitting a core thread 60 to pass through. A head 71 of a spring-biased rod 70 passes through the hole 35 of the front abutment plate 31 to be located in the slot 25 of the front die 21. As such, a reciprocating motion of the spring-biased rod 70 may cause the head 71 thereof to hit the element 62 to continuously form a front coupling head of coil-shaped element 62 in manufacturing process. As a result, a continuous coupling head 63 is formed in a front end of the element 62 and a continuous joint portion 64 is formed in a rear end of the element 62. Moreover, the slanted piece 443 is inserted through the slot 36 of the rear abutment plate 32 into the rear die 22. As stated above, the arcuate recessed portion 65 is formed on a top portion of the element 62 as the arcuate piece 446 of the shuttle assembly 44 is abutted on the top of element 62. As such, a vibration degree of the apparatus can be reduced significantly.

Additionally, the coil spring 442 is biased between a bottom of the cylindrical recess 441 and the rear abutment plate 32. Hence, it is possible of rotating the rear adjustment screw 461 to axially adjust the shuttle assembly 44 so as to precisely position an axial position of the arcuate piece 446. In addition, it is possible of performing a lateral adjustment of the apparatus for manufacturing slide fastener coil-shaped continuous element row by manipulating the side adjustment screw 48 to cause the coil spring 481 to push the shuttle assembly 44. As an end, the precision of a lateral position of the arcuate piece 446 can be increased. The rear forming assembly 40 further comprises two auxiliary side adjustment screws 49 having shanks disposed in two side holes adjacent the holes 416 and a coil spring 491 biased between an inner end of one auxiliary side adjustment screw 49 and the shuttle assembly 44. Thus, it is possible of rotating the auxiliary side adjustment screw 49 to laterally adjust the shuttle assembly 44 so as to further precisely position a lateral position of the shuttle assembly 44. As an end, the precision of the produced the accurate position of the arcuate recessed portion 65 of element 62 may be increased. It is noted that the shuttle assembly 44 further comprises a staged piece 445 on an outer side of the slanted piece 443 for increasing a strength thereof. With the provision of the staged piece 445, a size of the slanted piece 443 can be further reduced for being adapted to the production of small zippers.

Referring to FIGS. 6 to 11, there is shown a second preferred embodiment of an apparatus for manufacturing slide fastener coil-shaped continuous element row according to the invention. The differences between first and second preferred embodiments are detailed below. In the second preferred embodiment the block member 41 further comprises a central channel 410, a rectangular opening 411 in a front end of the channel 410 open to the outside, and a hole 412 at either side. The rear forming assembly 40 further comprises a main spring 42; a shaft mechanism 43 including a front rectangular projection 432 inserted through the channel 410, the opening 411, the slot 36 of the rear abutment plate 32, and the slot 26 of the rear die 22 to be proximate the mandrel 17, an intermediate cylindrical section 431 received in the channel 410 with the main spring 42 put thereon, and a rear enlargement having two side flats 433; two second side adjustment screws 47 disposed at holes 412; two elastic members (e.g., coil springs) 471 each biased between the second side adjustment screw 47 and the flat 433 of the rear enlargement of the shaft mechanism 43; and a second rear adjustment screw 46. Also, the rear cap 45 further comprises a central aperture 450 so that the second rear adjustment screw 46 can be driven through the aperture 450 to engage with the rear end the shaft mechanism 43.

With this construction, it is possible of rotating the second rear adjustment screw 46 to enable the shaft mechanism 43 to either push forward as the main spring 42 compressed or pull rearward as the main spring 42 expanded, in response, a distance of the front rectangular projection 432 projected into the zipper forming space defined is made optimal, i.e., further precisely positioned an axial position of the front rectangular projection 432 which is urged against the joint portion 64 of element 62. In response, a fine adjustment of the zipper forming space is made possible. Also, the mandrel 17 can be corrected by above adjustment if a precision thereof is adversely affected because wear or the size thereof exceeds an allowance due to machining error. Moreover, it is possible of adjusting a lateral position of the shaft mechanism 43 by manipulating the second side adjustment screws 47 to cause the coil springs 471 to push the flats 433 of the rear enlargement of the shaft mechanism 43. As an end, the precision of the produced accurate joint portion 64 of element 62 may be further increased.

Referring to FIGS. 12 to 16, there is shown a third preferred embodiment of an apparatus for manufacturing slide fastener coil-shaped continuous element row according to the invention. The differences between second and third preferred embodiments are detailed below. In the third preferred embodiment, there is further provided a shuttle mechanism 90 including a second shuttle assembly 91 including a front cylindrical recess 911, a coil spring 912 anchored in the cylindrical recess 911, a slanted piece 913 extended from an opening of the cylindrical recess 911, a flat piece 916 formed on an open end of the slanted piece 913, and a staged piece 915 on an outer side of the slanted piece 913 for increasing a strength thereof; a pair of third side adjustment screws 92 having shanks received in the side holes of the block member 41 and a coil spring 921 biased between the third side adjustment screw 92 and the second shuttle assembly 91; two second auxiliary side adjustment screws 93 having shanks disposed in side holes of the block member 41 and a coil spring 931 biased between an inner end of one second auxiliary side adjustment screw 93 and the second shuttle assembly 91; and a bottom cap 910 threadedly secured to the block member 41 for defining the second shuttle assembly 91 in the bottom channel 417. The rear cap 45 further comprise an aperture 452 for permitting a third rear adjustment screw 462 to drive through the aperture 452 to engage with the rear side of the second shuttle assembly 91.

An operation and characteristics of the additionally provided components will now be described below. The slanted piece 913 is inserted through the slot 36 of the rear abutment plate 32 into the rear die 22. A flat area 68 is formed on a bottom of the element 62 as the flat piece 916 of the second shuttle assembly 91 is abutted on the bottom of element 62. As such, the vibration degree of the apparatus can be reduced significantly. Additionally, the coil spring 912 is biased between a bottom of the cylindrical recess 911 and the, rear abutment plate 32. Hence, it is possible of rotating the third rear adjustment screw 462 to axially adjust the second shuttle assembly 91 so as to precisely position an axial position of the flat piece 916. In addition, it is possible of performing a lateral adjustment of the apparatus by manipulating the third side adjustment screw 92 to cause the coil spring 921 to push the second shuttle assembly 91. As an end, the precision of a lateral position of the flat piece 916 can be further increased. It is possible of rotating the second auxiliary side adjustment screw 93 to laterally adjust the second shuttle assembly 91 so as to further precisely position a lateral position of the second shuttle assembly 91. As an end, the precision of the produced a flat bottom 68 of element 62 may be further increased.

Note that a length of the flat bottom 68 of the element 62 with respect to the flat piece 916 is about three-fifth of a side length of the element 62. That is, a length ratio of the flat bottom 68 to the element 62 is 3 to 5.

Figure 15:
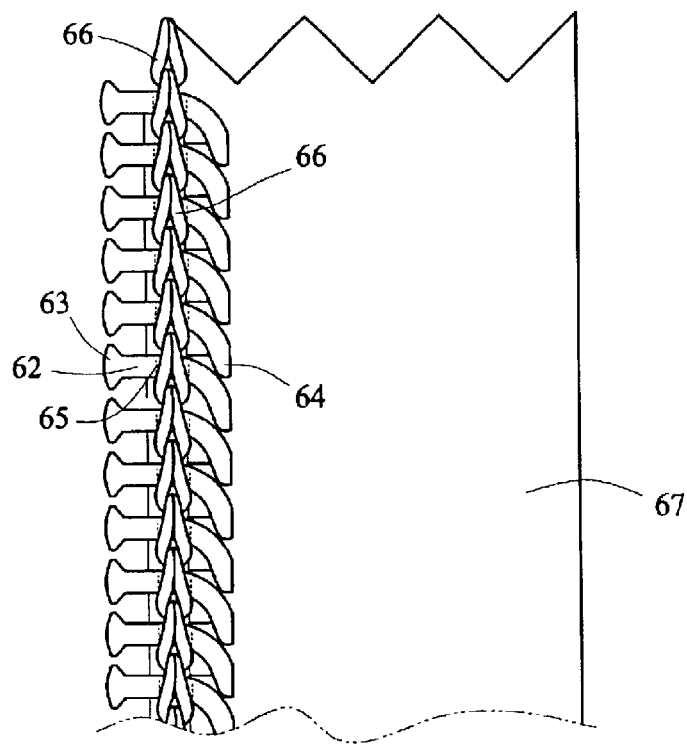
FIG. 15 is a plan view showing the element in a use state.
Figure 16:
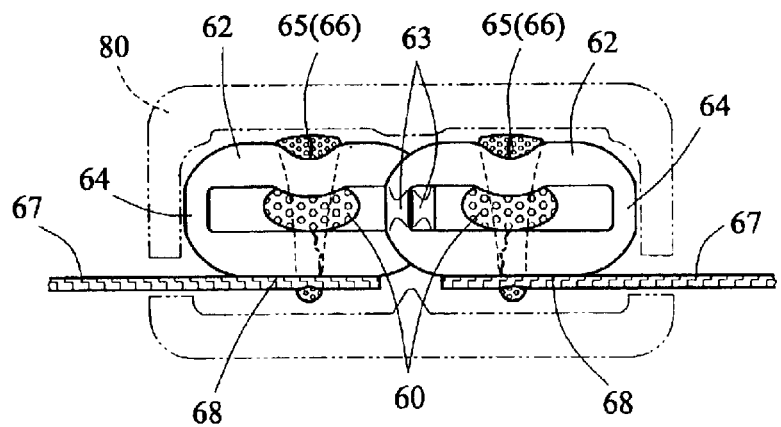
FIG. 16 is a cross-sectional view showing the element in the use state.
Figure 17:
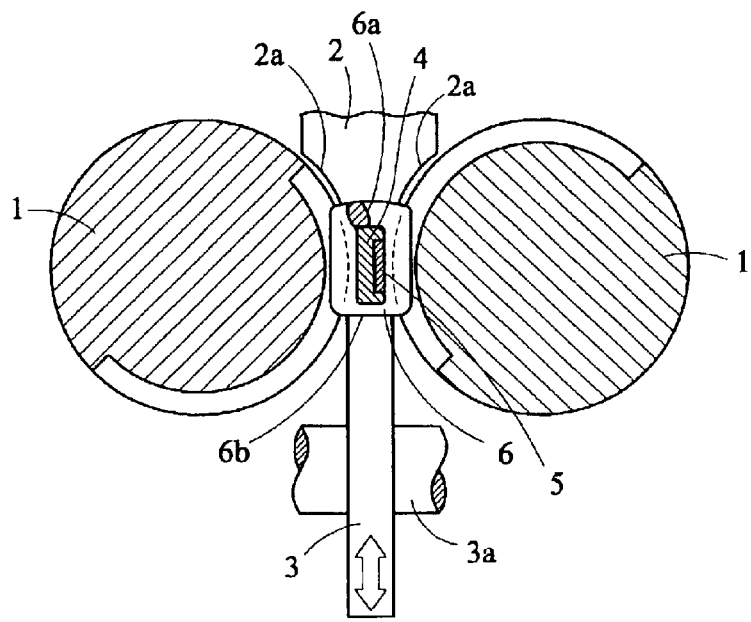
FIG. 17 is a cross-sectional view showing a layout of members of a coupling head forming portion of a conventional apparatus for manufacturing slide fastener.
Figure 18:
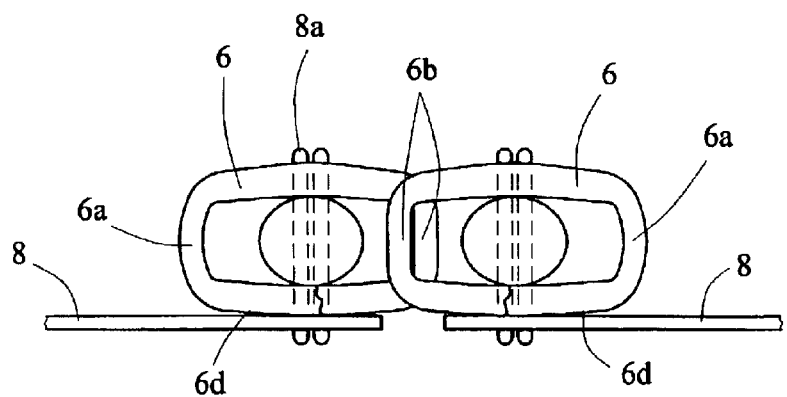
FIG. 18 is a plan view of the coil-shape element produced by the apparatus of FIG. 17 in a use state.
Figure 19:
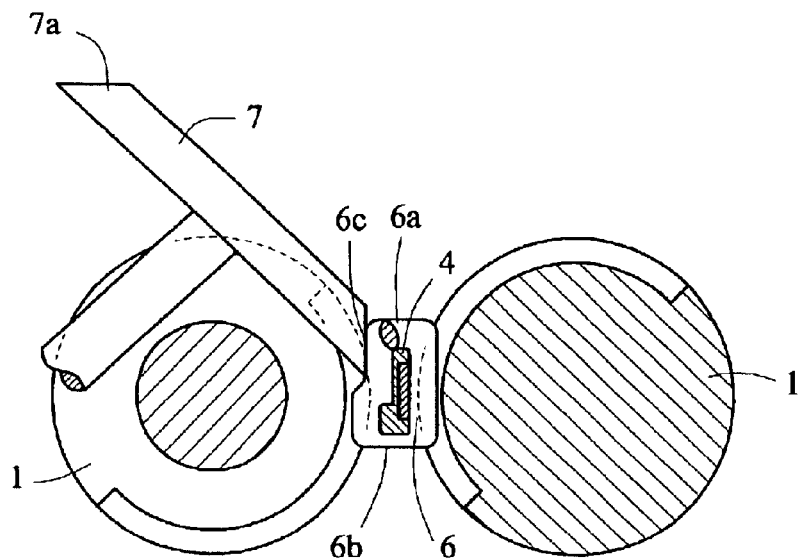
FIG. 19 is a cross-sectional view of a layout of members of an upper leg portion forming portion of the conventional apparatus.
Figure 20:
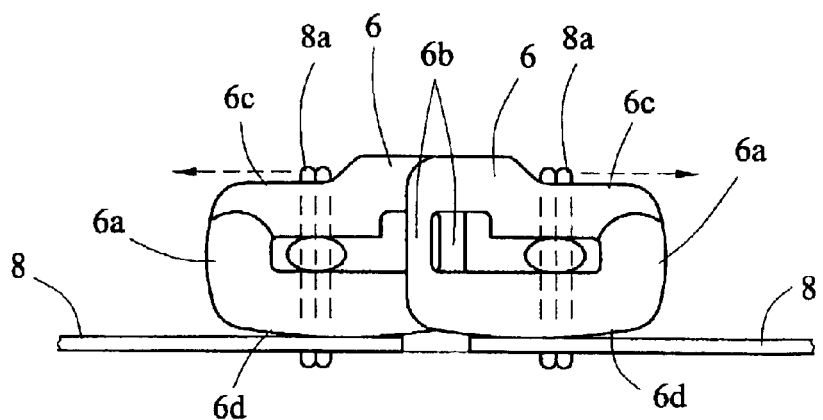
FIG. 20 is a plan view of the coil-shaped element produced by the conventional apparatus of FIG. 19 in a use state.

Referring to FIGS. 15 and 16 specifically, a use of the invention will now be described below. An arcuate recessed portion 65 is formed on a top of the element 62 which is stitched to a fabric 67. A seam 66 will be prevented from disengaging due to the protection of the recessed portion 65. As seen that a projected portion of the seam 66 is small, i.e., relatively smooth. In sliding head 80 of zipper up, a substantially rectangular shape is formed by the element 62 due to the joint portion 64 and the coupling head 63. Most importantly, the operation of the thus produced zipper element is very smooth and reliable. Moreover, both contact area and friction between the element 62 and the fabric 67 can be increased significantly by the provision of flat bottom 68. As a result, the zipper does not tend to slip (i.e., displace) during use. This is a great improvement relative to the prior art.

While the invention herein disclosed has been described by means of specific embodiments, numerous modifications and variations could be made thereto by those skilled in the art without departing from the scope and spirit of the invention set forth in the claims.

What is claimed is:

1. An apparatus for continuously manufacturing a slide fastener coil-shaped element row from a continuous monofilament, comprising:

a forming screw assembly including a first and a second forming screws each having an upper ridged post, an intermediate neck, and a lower thread section wherein the second screw further comprises a second neck below the intermediate neck by a predetermined distance;

a die assembly including a rectangular front die and a rectangular rear die, both dies being threadedly secured together, each having two parallel half circular longitudinal grooves, a top half-neck between the grooves, and an elongate slot in the half-neck so that a combination of the grooves is capable of receiving the first and the second forming screws and a combination of the half-necks is capable of receiving a mandrel;

an abutment assembly including a rectangular front abutment plate and a rectangular rear abutment plate, both plates being threadedly secured together wherein the front abutment plate has an inner longitudinal first trough sized to receive the front die, and an elongate first slot through the first trough; and the rear abutment plate has an inner longitudinal second trough sized to receive the rear die, and an elongate second slot through the second trough;

a rear forming assembly including a block member threadedly secured to the rear abutment plate, a shuttle assembly, and a rear cap wherein the block member includes a top channel and two side adjustment screws at both sides; the shuttle assembly received in the top channel and the shuttle assembly being defined in the top channel by a top cap which is threadedly secured to the block member; and the rear cap is threadedly secured to the block member and includes an aperture for receiving a rear adjustment screw which is engaged with a rear end of the shuttle assembly; and whereby a recessed portion is formed on a side of the element by being abutted the shuttle assembly against the element during continuously manufacturing.

2. The apparatus of claim 1, wherein the shuttle assembly comprising a front cylindrical recess, a coil spring anchored in the cylindrical recess, a slanted piece extended from a mouth of the cylindrical recess, and an arcuate piece formed on an open end of the slanted piece and whereby an arcuate recessed portion is formed on a top side of the element by abutment of the arcuate piece of the shuttle assembly against the element during manufacturing.

3. The apparatus of claim 2, wherein in an axial adjustment of the shuttle assembly a manipulation of the rear adjustment screw enables the shuttle assembly to either push forward or pull rearward, in response, an axial position of the arcuate piece which is projected into a zipper forming space defined by the front and the rear abutment plates and the first and the second forming screws is made optimal; and in a lateral adjustment of the shuttle assembly a manipulation of the side adjustment screw enables the shuttle assembly to move laterally.

4. The apparatus of claim 1, further comprising a second coil spring biased between the side adjustment screw and the shuttle assembly.

5. The apparatus of claim 1, wherein the rear forming assembly further comprises two auxiliary side adjustment screws in the sides and a third coil spring biased between an inner end of one of the auxiliary side adjustment screws and the shuttle assembly.

6. The apparatus of claim 1, wherein the shuttle assembly further comprises a staged piece on an outer side of the slanted piece for increasing a strength thereof.

7. An apparatus for continuously manufacturing a slide fastener coil-shaped element row from a continuous monofilament, comprising:

a forming screw assembly including a first and a second forming screws each having an upper ridged post, an intermediate neck, and a lower thread section wherein the second screw further comprises a second neck below the intermediate neck by a predetermined distance;

a die assembly including a rectangular front die and a rectangular rear die, both dies being threadedly secured together each including two parallel half circular longitudinal grooves, a top half-neck between the grooves, and an elongate slot in the half-neck so that a combination of the grooves is capable of receiving the first and the second forming screws and a combination of the half-necks is capable of receiving a mandrel;

an abutment assembly including a rectangular front abutment plate and a rectangular rear abutment plate, both plates being threadedly secured together wherein the front abutment plate has an inner longitudinal first trough sized to receive the front die, and an elongate first slot through the first trough; and the rear abutment plate has an inner longitudinal second trough sized to receive the rear die, and an elongate second slot through the second trough;

a rear forming assembly including a block member threadedly secured to the rear abutment plate and including a top channel and two pairs of side adjustment screws at both sides, a central channel, and a rectangular opening in a front end of the central channel open to the outside; a shuttle assembly being received in the top channel and including a front cylindrical recess, a coil spring anchored in the cylindrical recess, a slanted piece extended from a mouth of the cylindrical recess, and an arcuate piece formed on an open end of the slanted piece, the shuttle assembly being defined in the top channel by a top cap which is threadedly secured to the block member; a rear cap threadedly secured to the block member and includes two apertures for receiving two rear adjustment screws which are engaged with the shuttle assembly; and a shaft mechanism including a front rectangular projection inserted through the central channel, the rectangular opening, the slot of the rear abutment plate, and the slot of the rear die to be proximate the mandrel, an intermediate cylindrical section of the shaft mechanism received in the central channel with a main spring put thereon, and a rear enlargement having two side flats; and an arcuate recessed portion formed on a side of the element by abutment of the arcuate piece of the shuttle assembly against the element.

8. The apparatus of claim 7, wherein in an axial adjustment of the shuttle assembly or the shaft mechanism a manipulation of the rear adjustment screws enables the shuttle assembly or the shaft mechanism to either push forward or pull rearward, in response, either an axial position of the arcuate piece or the front rectangular projection which is projected into a zipper forming space defined by the front and the rear abutment plates and the first and the second forming screws is made optimal or a position of the mandrel is shifted to an optimum; and in a lateral adjustment of the shuttle assembly or the shaft mechanism a manipulation of either pair of the side adjustment screws enables the shuttle assembly or the shaft mechanism to move laterally, whereby a fine adjustment of the zipper forming space is made by adjusting the position of the front rectangular projection of the shaft mechanism or the position of the arcuate piece of the shuttle assembly during manufacturing.

9. The apparatus of claim 7, further comprising a second coil spring biased between one of the side adjustment screws and the shuttle assembly.

10. The apparatus of claim 7, wherein the rear forming assembly further comprises two auxiliary side adjustment screws in the sides and a third coil spring biased between an inner end of one of the auxiliary side adjustment screws and the shuttle assembly.

11. The apparatus of claim 7, wherein the shuttle assembly further comprises a staged piece on an outer side of the slanted piece for increasing a strength thereof.

12. The apparatus of claim 7, further comprising a pair of third coil springs wherein one is biased between the other side adjustment screw at one side and one flat of the rear enlargement of the shaft mechanism, and the other is biased between the other side adjustment screw at the other side and the other flat of the rear enlargement of the shaft mechanism.

13. An apparatus for continuously manufacturing a slide fastener coil-shaped element row from a continuous monofilament, comprising:
   a forming screw assembly including a first and a second forming screws each having an upper ridged post, an intermediate neck, and a lower thread section wherein the second screw further comprises a second neck below the intermediate neck by a predetermined distance;
   a die assembly including a rectangular front die and a rectangular rear die, both dies being threadedly secured together each including two parallel half circular longitudinal grooves, a top half-neck between the grooves, and an elongate slot in the half-neck so that a combination of the grooves is capable of receiving the first and the second forming screws and a combination of the half-necks is capable of receiving a mandrel;
   an abutment assembly including a rectangular front abutment plate and a rectangular rear abutment plate, both plates being threadedly secured together wherein the front abutment plate has an inner longitudinal first trough sized to receive the front die, and an elongate first slot through the first trough; and the rear abutment plate has an inner longitudinal second trough sized to receive the rear die, and an elongate second slot through the second trough; and
   a rear forming assembly including a block member threadedly secured to the rear abutment plate and including a bottom channels and at least a side adjustment screws at both sides, a bottom shuttle assemblies received in the bottom channel wherein the bottom shuttle assembly includes a front cylindrical recess, a second coil spring anchored in the cylindrical recess, a slanted piece extended from a mouth of the cylindrical recess, and a flat piece formed on an open end of the slanted piece, the bottom shuttle assembly being defined in the bottom channel by bottom cap which is threadedly secured to the block member; and a rear cap threadedly secured to the block member and includes a rear adjustment screw engaged with the bottom shuttle assembly;
   wherein a flat area is formed on bottom side of the element for increasing a friction when the flat piece of the bottom shuttle assembly is abutted on the element.

14. The apparatus of claim 13, wherein in an axial adjustment of the bottom shuttle assembly a manipulation of the rear adjustment screw enables the bottom shuttle assemblies to either push forward or pull rearward, in response, either an axial position of the arcuate piece which is projected into a zipper forming space defined by the front and the rear abutment plates and the first and the second forming screws is made optimal; and in a lateral adjustment of the bottom shuttle assembly a manipulation of the pairs of the side adjustment screws enables the bottom shuttle assembly to move laterally.

15. The apparatus of claim 13, wherein the rear forming assembly further comprises two pairs of auxiliary side adjustment screws in the sides and a coil springs biased between an inner end of the auxiliary side adjustment screws at one side and the bottom shuttle assemblies.

16. An apparatus for continuously manufacturing a slide fastener coil-shaped element row from a continuous monofilament, comprising:
   a forming screw assembly including a first and a second forming screws each having an upper ridged post, an intermediate neck, and a lower thread section wherein the second screw further comprises a second neck below the intermediate neck by a predetermined distance;
   a die assembly including a rectangular front die and a rectangular rear die, both dies being threadedly secured together each including two parallel half circular longitudinal grooves, a top half-neck between the grooves, and an elongate slot in the half-neck so that a combination of the grooves is capable of receiving the first and the second forming screws and a combination of the half-necks is capable of receiving a mandrel;
   an abutment assembly including a rectangular front abutment plate and a rectangular rear abutment plate, both plates being threadedly secured together wherein the front abutment plate has an inner longitudinal first trough sized to receive the front die, and an elongate first slot through the first trough; and the rear abutment plate has an inner longitudinal second trough sized to receive the rear die, and an elongate second slot through the second trough;
   a rear forming assembly including a block member threadedly secured to the rear abutment plate and including a top and a bottom channels and three pairs of side adjustment screws at both sides, a central channel, and a rectangular opening in a front end of the central channel open to the outside; top and bottom shuttle assemblies received in the top and the bottom channels respectively wherein the top shuttle assembly includes a front cylindrical recess, a first coil spring anchored in the cylindrical recess, a slanted piece extended from a mouth of the cylindrical recess, and an arcuate piece formed on an open end of the slanted piece and the bottom shuttle assembly includes a front cylindrical recess, a second coil spring anchored in the cylindrical recess, a slanted piece extended from a mouth of the cylindrical recess, and a flat piece formed on an open end of the slanted piece, the top and the bottom shuttle assembly being defined in the top and bottom channel by top and bottom caps respectively which are threadedly secured to the block member; a shaft mechanism including a front rectangular projection inserted through the central channel, the rectangular opening, the slot of the rear abutment plate, and the slot of the rear die to be proximate the mandrel, an intermediate cylindrical section of the shaft mechanism received in the central channel with a main spring put thereon, and a rear enlargement having two side flats; and a rear cap threadedly secured to the block member and includes three rear adjustment screws engaged with the shuttle assemblies and the shaft mechanism respectively;

an arcuate recessed portion formed on a side of the element when the arcuate piece of the top shuttle assembly is abutted on the element; and a flat area formed on an other side of either element for increasing a friction when the flat piece of the bottom shuttle assembly is abutted on the element.

17. The apparatus of claim 16, wherein in an axial adjustment of one of the shuttle assemblies or the shaft mechanism a manipulation of the respective rear adjustment screws enables one of shuttle assemblies or the shaft mechanism to either push forward or pull rearward, in response, either an axial position of the arcuate piece which is projected into a zipper forming space defined by the front and the rear abutment plates and the first and the second forming screws is made optimal or a position of the mandrel is shifted to an optimum; and in a lateral adjustment of one of the shuttle assemblies or the shaft mechanism a manipulation of one of the respective pairs of the side adjustment screws enables one of the shuttle assemblies or the shaft mechanism to move laterally.

18. The apparatus of claim 16, wherein the rear forming assembly further comprises two pairs of auxiliary side adjustment screws in the sides and a pair of third coil springs each biased between an inner end of one of the auxiliary side adjustment screws at one side and one of the shuttle assemblies.

* * * * *